(12) United States Patent
Vanman et al.

(10) Patent No.: US 8,982,944 B2
(45) Date of Patent: Mar. 17, 2015

(54) METHOD AND SYSTEM FOR CATEGORIZED EVENT RECORDING OF IMAGES IN MULTIPLE RESOLUTION LEVELS

(75) Inventors: Robert V. Vanman, McKinney, TX (US); Andrew Cilia, McKinney, TX (US)

(73) Assignee: Enforcement Video, LLC, Plano, TX (US)

(*) Notice: Subject to any disclaimer, the term of this patent is extended or adjusted under 35 U.S.C. 154(b) by 63 days.

(21) Appl. No.: 12/694,931

(22) Filed: Jan. 27, 2010

(65) Prior Publication Data

US 2010/0309971 A1 Dec. 9, 2010

Related U.S. Application Data

(60) Provisional application No. 61/184,907, filed on Jun. 8, 2009.

(51) Int. Cl.
*H04N 19/00* (2014.01)
*H04N 19/59* (2014.01)
*H04N 19/61* (2014.01)

(52) U.S. Cl.
CPC ............... *H04N 19/59* (2014.01); *H04N 19/61* (2014.11)
USPC ...................................... 375/240.01; 348/568

(58) Field of Classification Search
USPC ...................................... 375/240.01; 348/568
See application file for complete search history.

(56) References Cited

U.S. PATENT DOCUMENTS

| | | | |
|---|---|---|---|
| 4,389,706 A | 6/1983 | Gomola et al. |
| 4,949,186 A | 8/1990 | Peterson |
| 5,225,882 A | 7/1993 | Hosokawa et al. |
| 5,515,042 A | 5/1996 | Nelson |
| 5,651,075 A | 7/1997 | Frazier et al. |
| 5,677,979 A | 10/1997 | Squicciarini et al. |
| 5,689,442 A | 11/1997 | Swanson et al. |
| 5,703,604 A | 12/1997 | McCutchen |
| 5,809,161 A | 9/1998 | Auty et al. |
| 5,844,599 A | 12/1998 | Hildin |
| 5,898,866 A | 4/1999 | Atkins et al. |
| 6,215,519 B1 | 4/2001 | Nayar et al. |
| 6,252,989 B1 | 6/2001 | Geisler et al. |
| 6,282,462 B1 | 8/2001 | Hopkins |
| 6,335,789 B1 | 1/2002 | Kikuchi |

(Continued)

OTHER PUBLICATIONS

U.S. Appl. No. 12/362,302, Andrew Cilia et al.

(Continued)

*Primary Examiner* — Sath V Perungavoor
*Assistant Examiner* — Jeffery Williams
(74) *Attorney, Agent, or Firm* — Winstead PC

(57) ABSTRACT

A method includes compressing digital data of video images to a second resolution level and storing the digital data at a plurality of resolution levels. The plurality of resolution levels include a first resolution level and the second resolution level. The first resolution level is greater than the second resolution level. The method also includes receiving a category selection, responsive to the received category selection, determining whether the digital data stored at least the first resolution level is needed, responsive to a determination that the digital data stored at least the first resolution level is not needed, performing one of the following: discarding the digital data determined to not be needed; and flagging the digital data determined to not be needed to be discarded later.

26 Claims, 8 Drawing Sheets

(56) References Cited

U.S. PATENT DOCUMENTS

| | | |
|---|---|---|
| 6,345,219 B1 | 2/2002 | Klemens |
| 6,373,962 B1 | 4/2002 | Kanade et al. |
| 6,389,340 B1 | 5/2002 | Rayner |
| 6,445,824 B2 * | 9/2002 | Hieda .................... 382/232 |
| 6,456,321 B1 | 9/2002 | Ito et al. |
| 6,704,281 B1 | 3/2004 | Hourunranta et al. |
| 6,707,489 B1 | 3/2004 | Maeng et al. |
| 6,734,911 B1 | 5/2004 | Lyons |
| 6,801,574 B2 | 10/2004 | Takeuchi et al. |
| 6,831,556 B1 | 12/2004 | Boykin |
| 7,023,913 B1 | 4/2006 | Monroe |
| 7,119,832 B2 | 10/2006 | Blanco et al. |
| 7,215,876 B2 | 5/2007 | Okada et al. |
| 7,262,790 B2 | 8/2007 | Bakewell |
| 7,272,179 B2 | 9/2007 | Siemens et al. |
| 7,373,395 B2 | 5/2008 | Brailean et al. |
| 7,405,834 B1 | 7/2008 | Marron et al. |
| 7,495,579 B2 | 2/2009 | Sirota et al. |
| 7,574,131 B2 | 8/2009 | Chang et al. |
| 7,583,290 B2 | 9/2009 | Enright et al. |
| 7,711,150 B2 | 5/2010 | Simon |
| 7,768,548 B2 | 8/2010 | Silvernail et al. |
| 7,894,632 B2 | 2/2011 | Park et al. |
| 7,929,010 B2 | 4/2011 | Narasimhan |
| 8,022,874 B2 | 9/2011 | Frieaizen |
| 2002/0040475 A1 | 4/2002 | Yap et al. |
| 2002/0064314 A1 | 5/2002 | Comaniciu et al. |
| 2002/0140924 A1 | 10/2002 | Wangler et al. |
| 2002/0141618 A1 | 10/2002 | Ciolli et al. |
| 2002/0141650 A1 | 10/2002 | Keeney et al. |
| 2002/0149476 A1 | 10/2002 | Ogura |
| 2002/0180759 A1 | 12/2002 | Park et al. |
| 2003/0025599 A1 | 2/2003 | Monroe |
| 2003/0025812 A1 | 2/2003 | Slatter |
| 2003/0071891 A1 | 4/2003 | Geng |
| 2003/0112133 A1 | 6/2003 | Webb et al. |
| 2003/0172123 A1 | 9/2003 | Polan et al. |
| 2003/0214585 A1 | 11/2003 | Bakewell |
| 2004/0021852 A1 | 2/2004 | DeFlumere |
| 2004/0056779 A1 | 3/2004 | Rast |
| 2004/0080615 A1 | 4/2004 | Klein et al. |
| 2004/0119869 A1 | 6/2004 | Tretter et al. |
| 2004/0150717 A1 | 8/2004 | Page et al. |
| 2004/0218099 A1 | 11/2004 | Washington |
| 2004/0221311 A1 | 11/2004 | Dow et al. |
| 2004/0223058 A1 | 11/2004 | Richter et al. |
| 2004/0252193 A1 | 12/2004 | Higgins |
| 2004/0258149 A1 | 12/2004 | Robinson et al. |
| 2005/0090961 A1 | 4/2005 | Bonk et al. |
| 2005/0196140 A1 | 9/2005 | Moteki |
| 2005/0206773 A1 | 9/2005 | Kim et al. |
| 2006/0028547 A1 | 2/2006 | Chang |
| 2006/0033813 A1 | 2/2006 | Provinsal et al. |
| 2006/0098843 A1 | 5/2006 | Chew |
| 2006/0152636 A1 * | 7/2006 | Matsukawa et al. .......... 348/715 |
| 2006/0158968 A1 | 7/2006 | Vanman et al. |
| 2006/0159325 A1 | 7/2006 | Zeineh et al. |
| 2006/0187305 A1 | 8/2006 | Trivedi et al. |
| 2006/0193384 A1 | 8/2006 | Boyce |
| 2006/0244826 A1 | 11/2006 | Chew |
| 2007/0024706 A1 | 2/2007 | Brannon et al. |
| 2007/0029825 A1 | 2/2007 | Franklin et al. |
| 2007/0109411 A1 | 5/2007 | Jung et al. |
| 2007/0200933 A1 | 8/2007 | Watanabe et al. |
| 2007/0217761 A1 | 9/2007 | Chen et al. |
| 2007/0222678 A1 | 9/2007 | Ishio et al. |
| 2007/0222859 A1 | 9/2007 | Chang et al. |
| 2007/0296817 A1 | 12/2007 | Ebrahimi et al. |
| 2008/0007438 A1 * | 1/2008 | Segall et al. ................. 341/61 |
| 2008/0301088 A1 * | 12/2008 | Landry et al. ................ 707/3 |
| 2009/0046157 A1 | 2/2009 | Cilia et al. |
| 2009/0049491 A1 | 2/2009 | Karonen et al. |
| 2009/0102950 A1 | 4/2009 | Ahiska |
| 2009/0129672 A1 | 5/2009 | Camp, Jr. et al. |
| 2009/0207248 A1 | 8/2009 | Cilia et al. |
| 2009/0213218 A1 | 8/2009 | Cilia et al. |
| 2009/0251530 A1 | 10/2009 | Cilia |
| 2011/0157376 A1 | 6/2011 | Lyu et al. |
| 2011/0234749 A1 | 9/2011 | Alon |

OTHER PUBLICATIONS

U.S. Appl. No. 13/095,107, Cilia
U.S. Appl. No. 13/109,557, Cilia.
Copenheaver, Blaine R., International Search Report for PCT/US2009/032462 as mailed Mar. 10, 2009 (3 pages).
Kortum, P. et al., "Implementation of a foveated image coding system for image bandwidth reduction", SPIE Proceedings, vol. 2657, 1996, pp. 350-360, XP-002636638.
Geisler, Wilson S. et al., "A real-time foveated multiresolution system for low-bandwidth video communication", Proceedings of the SPIE—The International Society for Optical Engineering SPIE—Int. Soc. Opt. Eng. USA, vol. 3299, 1998, pp. 294-305, XP-002636639.
U.S. Appl. No. 12/779,492, Vanman.
U.S. Appl. No. 12/779,564, Vanman.
U.S. Appl. No. 12/780,050, Vanman.
U.S. Appl. No. 12/780,092, Vanman.
Copenheaver, Blaine R., International Search Report for PCT/US2009/000930 as mailed Apr. 9, 2009, (4 pages).
Young, Lee W., International Search Report for PCT/US2009/000934 as mailed Apr. 29, 2009, (3 pages).
Copenheaver, Blaine R., International Search Report for PCT/US2010030861 as mailed Jun. 21, 2010, (4 pages).
Nhon, Diep T., International Search Report for PCT/US05/36701 as mailed Oct. 25, 2006 (5 pages).
Cilia, Andrew, "U.S. Appl. No. 13/489,615" filed Jun. 6, 2012.

* cited by examiner

METHOD AND SYSTEM FOR CATEGORIZED EVENT RECORDING OF IMAGES IN MULTIPLE RESOLUTION LEVELS

CROSS-REFERENCE TO RELATED APPLICATIONS

This patent application claims priority from and incorporates by reference the entire disclosure of U.S. Patent Application No. 61/184,907, filed on Jun. 8, 2009. This patent application also incorporates by reference U.S. patent application Ser. No. 11/249,662, filed Oct. 12, 2005.

BACKGROUND

1. Technical Field

This patent application relates generally to video surveillance and, in particular, to systems and methods for multi-resolution-level storage of images.

2. History of Related Art

Many law-enforcement vehicles include a video-recording device to capture video of activities transpiring both outside and inside the vehicle. One use of the video captured by these video cameras is as evidence in a criminal trial. In order for the video to be used as evidence, images thereof must be clearly identifiable by, for example, a jury or an expert witness. Often the law-enforcement vehicles and their video-recording devices remain in use for extended periods of time, for example, when an officer stays out all night on patrol. It is therefore often necessary to compress the video being recorded in order to be able to store large volumes of data.

SUMMARY

A method includes compressing digital data of video images to a second resolution level and storing the digital data at a plurality of resolution levels. The plurality of resolution levels include a first resolution level and the second resolution level. The first resolution level is greater than the second resolution level. The method also includes receiving a category selection, responsive to the received category selection, determining whether the digital data stored at least the first resolution level is needed, responsive to a determination that the digital data stored at least the first resolution level is not needed, performing one of the following: discarding the digital data determined to not be needed; and flagging the digital data determined to not be needed to be discarded later.

A method includes storing digital data of video images at a first resolution level, receiving a category selection, responsive to the received category selection, determining whether greater compression of the digital data is needed, responsive to a determination that greater compression of the digital data is needed, compressing the digital data to at least a second resolution level and performing one of the following: discarding the digital data stored at the first resolution level and flagging the digital data stored at the first resolution level to be discarded later. The first resolution level is greater than the at least a second resolution level.

A computer-program product includes a computer-usable medium having computer-readable program code embodied therein. The computer-readable program code is adapted to be executed to implement a method that includes compressing digital data of video images to at least a second resolution level, storing the digital data at a plurality of resolution levels, the plurality of resolution levels comprising a first resolution level and the second resolution level, receiving a category selection, responsive to the received category selection, determining whether the digital data stored at least the first resolution level is needed, responsive to a determination that the digital data stored at least the first resolution level is not needed, performing one of the following: discarding the digital data determined to not be needed and flagging the digital data determined to not be needed to be discarded later. The first resolution level is greater than the second resolution level.

A computer-program product includes a computer-usable medium having computer-readable program code embodied therein. The computer-readable program code is adapted to be executed to implement a method that includes storing digital data of video images at a first resolution level, receiving a category selection, responsive to the received category selection, determining whether greater compression of the digital data is needed, responsive to a determination that greater compression of the digital data is needed, compressing the digital data to at least a second resolution level and performing one of the following: discarding the digital data stored at the first resolution level and flagging the digital data stored at the first resolution level to be discarded later. The first resolution level is greater than the at least a second resolution level.

BRIEF DESCRIPTION OF THE DRAWINGS

A more complete understanding of various embodiments of the present invention may be obtained by reference to the following Detailed Description when taken in conjunction with the accompanying Drawings, wherein.

DETAILED DESCRIPTION OF ILLUSTRATIVE EMBODIMENTS

Figure 1A:
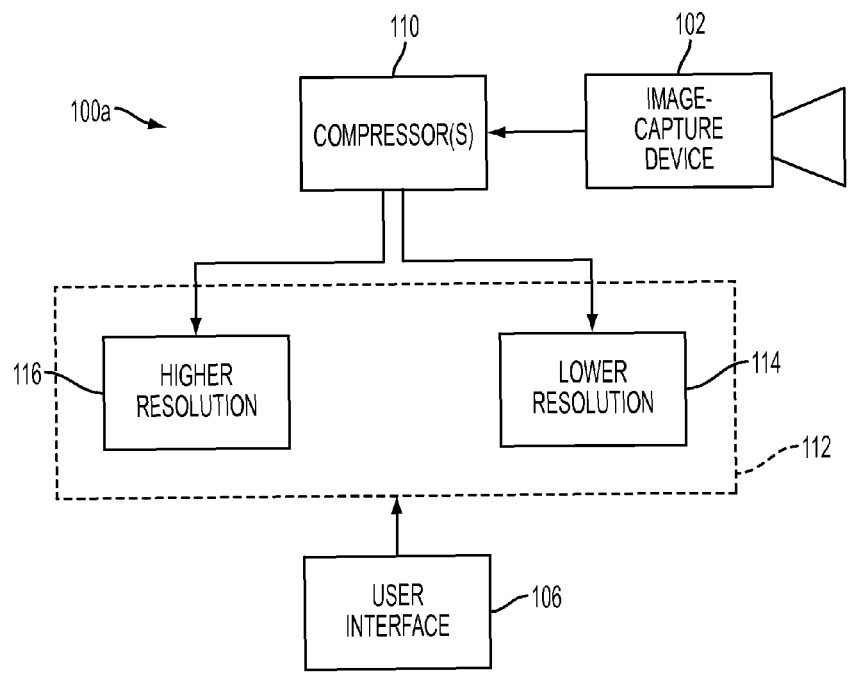
FIGS. 1A-1B are schematic diagrams of systems for capturing and storing video data.

Various embodiments of the invention will now be described more fully with reference to the accompanying drawings. The invention may, however, be embodied in many different forms and should not be construed as limited to the embodiments set forth herein; rather, the embodiments are provided so that this disclosure will be thorough and complete and will fully convey the scope of the invention to those skilled in the art.

In a typical embodiment, pixels of a video data stream coming from a video camera in a vehicle such as, for example, a law-enforcement vehicle may contain both chroma (color information) and luma (brightness or black and white information). Most of the resolution may be contained in the black and white information of the video data stream, even though the images may be color images. Between the luma and chroma information, the luma may contain much of the information relative to how much detail in the video data stream is visible.

In order to store over long periods of time a typically large amount of video data captured by the video camera, data-compression algorithms are often used to compress the video data. In a typical embodiment, the video data may be, for example, still images or motion video. There are various data-compression algorithms currently in use for compressing video data. The data-compression algorithms may include, for example, lossless algorithms and lossy algorithms. Lossless algorithms are a class of data-compression algorithms that allow a replica of original data to be reconstructed from compressed data. In contrast, lossy algorithms are a class of data-compression algorithms that allow an approximation of the original data to be reconstructed in exchange for a better data-compression rate. In a lossy algorithm, some visual quality is lost in the data-compression process, which lost visual quality cannot be restored.

Data-compression algorithms typically utilize a combination of techniques for compressing, for example, video data. The combination of techniques for compressing the video data may include, for example, downsampling or subsampling, block splitting, pixelating, and/or lessening resolution. In various embodiments, compression of raw video data may be utilized to reduce a file size of captured video data to be stored. As used herein, the general term compression may include, for example: reducing spatial resolution; changing the compression coefficients and/or parameters; reducing the frame rate of the video; reducing or eliminating color content; reducing the number of bits used to represent a pixel; and/or other file-size reduction algorithms.

A few examples of data-compression algorithms include the MPEG family of algorithms such as, for example, MPEG 2 and MPEG 4. Almost all data-compression algorithms lessen the clarity and sharpness of the compressed video data, making, for example, facial features, letters, and numbers more difficult to identify. Because clarity is often critical in police work such as, for example, in identifying a particular vehicle or suspect to a jury, it may be desirable that important images, for example, images that may be used as evidence at a criminal trial, remain sufficiently clear even after the video data has been compressed. For example, when video of a traffic stop is recorded, it is important that the clarity of, for example, a license plate of a vehicle remain legible so that letters and numbers of the license plate are identifiable.

In a typical embodiment, some cameras may, for example, capture video data at approximately 480 horizontal lines while the video data may be recorded at, for example, 120 horizontal lines. The resolution level of the video data being recorded may be, for example, one-fourth the resolution of what the camera actually captured. By varying the amount of compression of the video data based on importance of events captured, deleterious effects of data-compression algorithms can be lessened while still allowing large amounts of video evidence to be stored and retained.

FIG. 1A is a schematic diagram of a system 100a for capturing and storing video data. The system 100a includes an image-capture device 102 for capturing raw video data. The image-capture device 102 may, for example, be located at various locations within or on a police vehicle. In a typical embodiment, the image-capture device 102 may, for example, be located on a front console of the law-enforcement vehicle in order to capture events occurring outside of the law-enforcement vehicle. In a typical embodiment, the image-capture device 102 is a digital video camera. The system 100a further includes at least one compressor 110 interoperably connected to the image-capture device 102. The captured raw video data is transmitted from the image-capture device 102 to the at least one compressor 110 to compress the raw video data. In some embodiments, the raw video data may be temporarily stored in a buffer or temporary storage database before being compressed.

In various embodiments, the at least one compressor 110 may compress the raw data to multiple resolution levels using one or more compression parameters. In a typical embodiment, the at least one compressor 110 is adapted to compress video data from the image-capture device 102 to at least a first resolution level and a second resolution level. The first resolution level is often greater than the second resolution level. For example, at the first resolution level, the video data is often compressed substantially less than at the second resolution level. In some embodiments, the first resolution level may be obtained by not compressing the video data at all.

In the embodiment shown, the at least one compressor 110 compresses the raw data to two different resolution levels. The lower resolution data 114 and the higher resolution data 116 are then stored in a storage medium 112. In a typical embodiment, the storage medium 112 uses a hard drive, DVD, or other recording medium. In some embodiments, all events captured may be stored at a lower resolution level and high-priority events captured may also be stored at a higher resolution level. In this way, a low-resolution copy of all events may be stored for various reasons, including, but not limited to, trail audits, long-term backup, and/or anti-profiling law-compliance.

The system 100a also includes a user interface 106 for receiving an input from a user. The input may be utilized to select an event type or category of the event from a list of categories of event types. In a typical embodiment, an event recorded by the image-capture device 102 may be, for example, a routine traffic stop, a driving-while-intoxicated (DWI) traffic stop, a crash investigation, or any other event that may be recorded by the image-capture device 102. Of the events recorded by the image-capture device 102, some of the events may be of higher importance than others. In some embodiments, it may be desirable to store events of higher importance at higher resolution levels and store events of lower importance at lower resolution levels. For example, a routine traffic stop may be an event of lower importance while a DWI traffic stop may be an event of higher importance. Once a user inputs information corresponding to the event type into the user interface 106, information indicative of the input is transmitted from the user interface 106 and used by the system 100a to select either the lower resolution data 114 or the higher resolution data 116.

In some embodiments, the lower resolution data 114 and the higher resolution data 116 are stored in a temporary storage database until a selection is made. In various embodiments, the selected data either remains stored or is stored in a more permanent storage database and the non-selected data is discarded. In various embodiments, instead of discarding the data that was not selected, this data may be flagged and stored while storage space is available. When the amount of data in the storage database reaches a predetermined threshold, the system 100a may discard the flagged data to ensure adequate space is available.

In various embodiments, a user may select the type of event captured by the image-capture device 102 from a list of categories of event types. A resolution level or amount of compression may be predetermined for each category. Selection of a category automatically sets the degree to which the video data corresponding to the captured event is to be compressed. In some embodiments, uncompressed data corresponding to the video data may be temporarily stored in a buffer until the user information corresponding to the event type is received. In other embodiments, data compressed to a plurality of different levels may be stored in a buffer until the user information corresponding to the event type is received. In some embodiments, the user may select the event type of an event prior to or during the event occurring. In some embodiments, the user may then change the selection after the event has concluded or while the event is still in progress. In some embodiments, a wireless device may allow a user to select or change an event type wirelessly. In some embodiments, a user may select the level of compression rather than selecting the event type.

In some embodiments, a law-enforcement officer can, for example, point the image-capture device 102 in a first direction to capture an area of interest for a first period of time and then point the image-capture device 102 in a second direction for a second period of time. The officer may want to store the video data corresponding to the first period of time at a higher resolution level and the second period of time at a lower resolution level. For example, the law-enforcement officer may pull up behind a vehicle and point the image-capture device 102 to capture the license plate of the vehicle prior to approaching the vehicle in the course of a routine traffic stop. In that way, the license plate can later be viewed at the higher resolution level while the rest of the traffic stop, if an event of lower importance, can be stored at a lower resolution level. The at least one compressor 110 may be implemented using one or both of hardware and software.

In some embodiments, various algorithms may be utilized to automatically identify the type of event being recorded. For example, a license-plate detection algorithm may automatically detect a license plate and determine that a traffic stop is the event being recorded. An algorithm may then detect that a sobriety test is being administered and determine that a DWI stop is the event being recorded. In some embodiments, the event most likely to have been recorded may then be displayed to a user for confirmation. In some embodiments, the image-capture device 102 may be continuously capturing video data, which may subsequently be broken into a plurality of events. Various algorithms may be utilized to determine when a first event ends and a second event begins. For example, turning on and off lights and/or sirens, shifting the police vehicle into park, and/or opening and closing of a vehicle door may be indicators used to segment the captured video data into events.

Figure 1B:
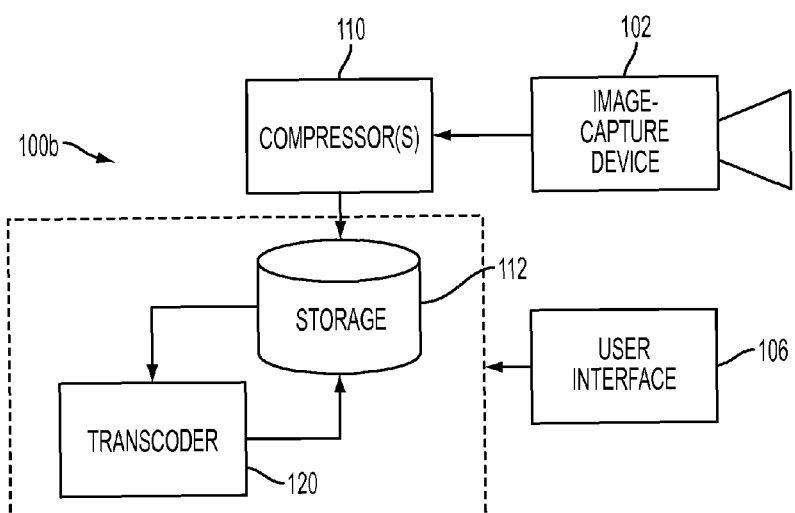

FIG. 1B is a schematic diagram of a system 100*b* for capturing and storing video data. The system 100*b* includes the image-capture device 102 for capturing events occurring in a field of view of the image-capture device 102. Raw data captured by the image-capture device 102 is sent to the at least one compressor 110 to be compressed. In various embodiments, the at least one compressor 110 may compress the raw data to at least a first resolution level. The compressed data is then stored in the storage medium 112. The system 100*b* also includes the user interface 106 for receiving user input.

The input may be a selection of an event type, selection of a resolution level, or other indicator that the system 100*b* may use to determine if the stored data should be further compressed. For example, if the captured event is a high-priority event, the stored data may not need further compression. In some embodiments, if further compression is not needed, the data may be moved from a first storage database to a second storage database. In some embodiments, data stored in the storage medium 112 will remain stored in the storage medium 112 unless further compression is required. For example, if the captured event is a low-priority event, the stored data may need further compression. In that case, the stored data may be sent to a transcoder 120 to be compressed to a lower resolution level by re-encoding or transcoding the data.

In various embodiments, re-encoding a video file, for example, an MPEG video file, can be done relatively efficiently because the images do not need to be fully decoded in order to be recompressed at a lower tempo/spatial resolution or with a different quantization coefficient. Once the data has been compressed further, the data may be stored in the storage medium 112. In some embodiments, the re-compressed data is re-stored in the original database while in other embodiments the re-compressed data is stored in a second database.

Figure 2A:
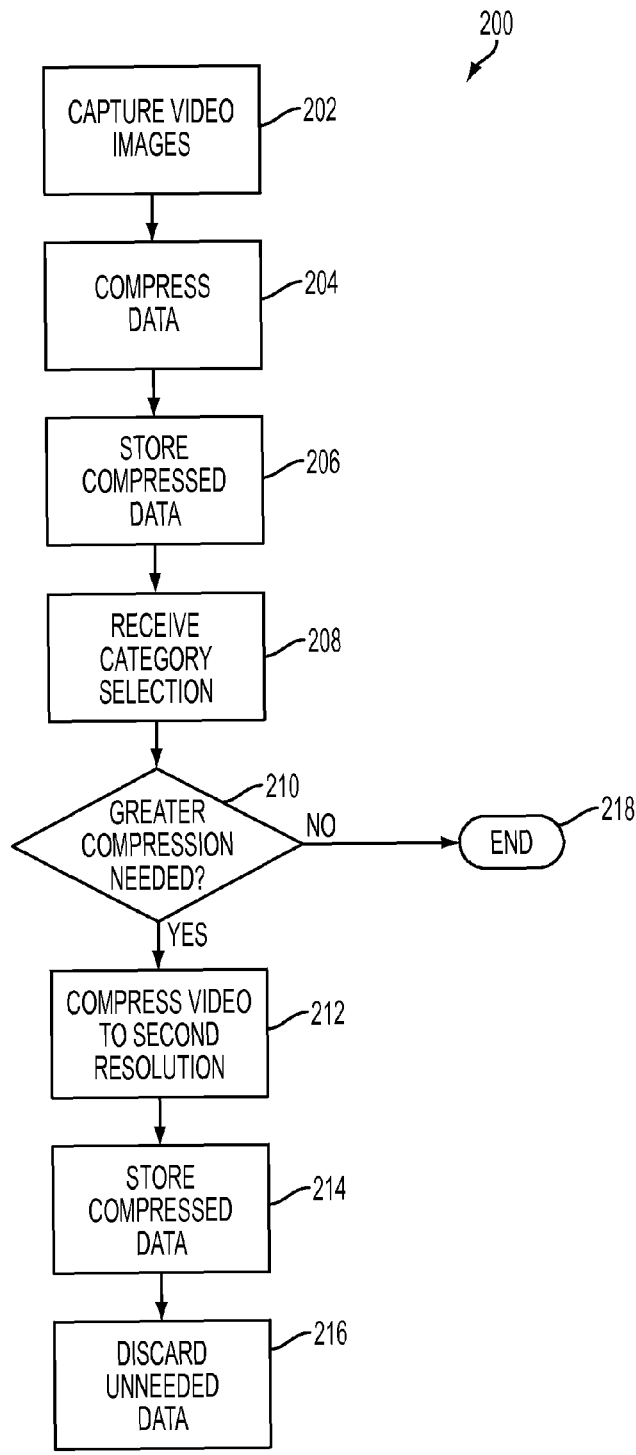
FIG. 2 is a flow chart of a process for capturing and storing video data.

FIG. 2A is a flow chart illustrating a process 200 for compressing and storing video data. The process 200 begins at step 202. At step 202, an image-capture device such as, for example, a digital video camera, captures raw video data from a field of view of the image-capture device. In a typical embodiment, the image-capture device may be mounted in a law-enforcement vehicle and adapted to capture the video data while the law-enforcement vehicle is moving and also when the law-enforcement vehicle is stopped such as, for example, during a traffic stop. From step 202, the process 200 proceeds to step 204. At step 204, the captured raw video data is compressed to a first resolution level. In some embodiments, step 204 may be omitted such that uncompressed data is presented to step 206.

At step 206, the compressed data is stored on a storage medium. At step 208, a user interface receives a category selection from a user. In some embodiments, a plurality of event identifiers are displayed on the user interface and the user selects one of the event identifiers corresponding to the events recorded by the image-capture device. After an event identifier corresponding to a category of event types is received at step 208, at step 210 a determination is made as to whether greater compression is needed. If greater compression is determined to be needed, the data compressed to the first resolution level is re-compressed or transcoded to at least a second resolution level at step 212. In some embodiments, the degree of compression needed is determined and the data is re-compressed or transcoded to a plurality of resolution levels. If at step 210 further compression is not determined to be needed, the process 200 ends.

At step 214, the data compressed to at least a second resolution level is stored on a recording medium such as, for example, a DVD, BLU-RAY disc, a VHS tape, or other appropriate recording medium. In some embodiments, if, for example, the data has been compressed to a second and a third resolution level, one or both of the data so compressed may be stored responsive to a category selection. At step 216, the data compressed to the first resolution level (or uncompressed data in some embodiments) may be discarded or stored at a lower priority level to be discarded at a later time if additional storage space is needed.

Figure 2B:
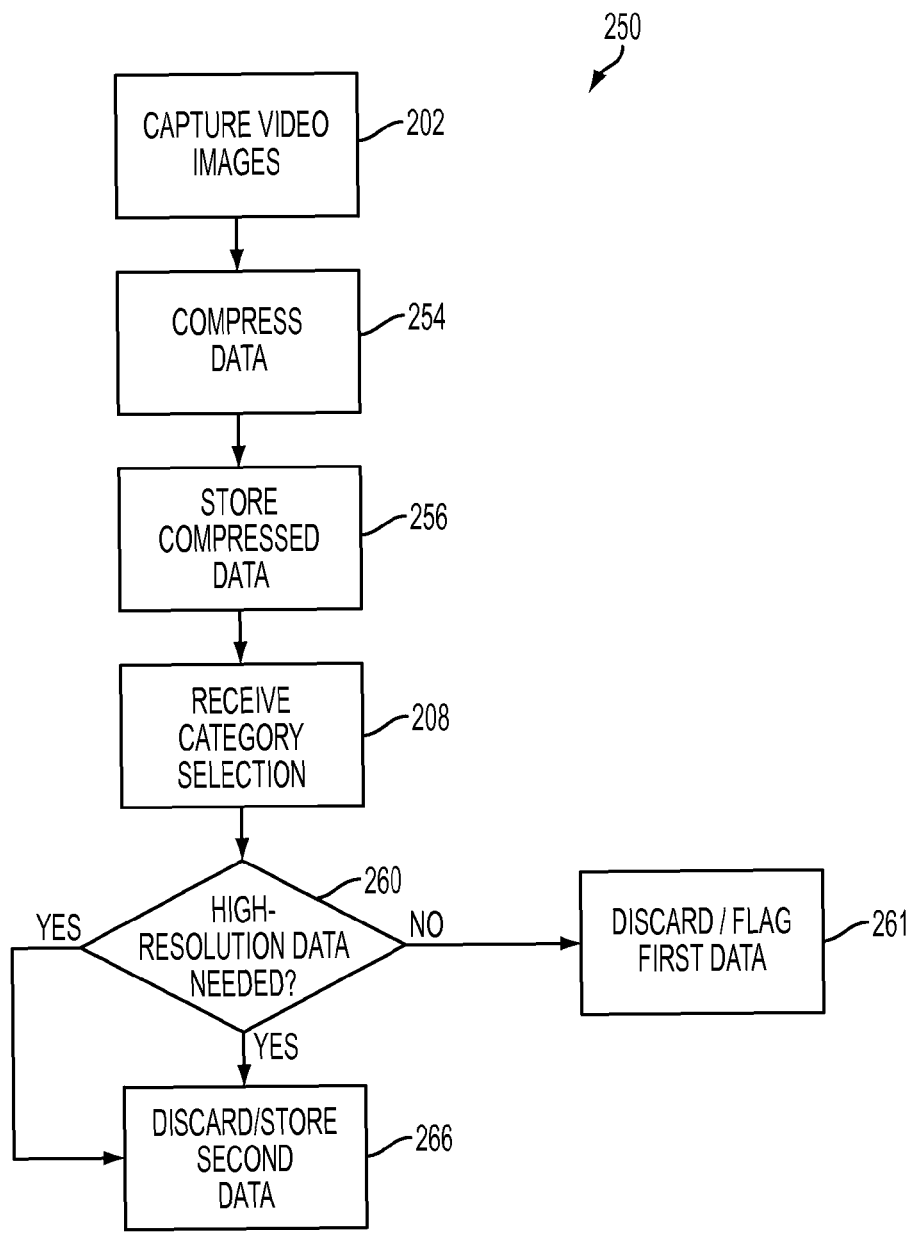

FIG. 2B is a flow chart illustrating a process 250 for compressing and storing video data. The process 250 begins at step 202. At step 202, an image-capture device such as, for example, a digital video camera, captures raw video data from a field of view of the image-capture device. In a typical embodiment, the image-capture device may be mounted in a law-enforcement vehicle and adapted to capture the video data while the law-enforcement vehicle is moving and also when the law-enforcement vehicle is stopped such as, for example, during a traffic stop. From step 202, the process 250 proceeds to step 254.

At step 254, the captured raw video data is compressed to at least a second resolution level. In other words, the captured raw video data is in compressed to a first resolution level and at least the second resolution level and, in other embodiments, the captured raw video data is stored uncompressed and at least the second resolution level. From step 254, execution proceeds to step 256. At step 256, the data resulting from step 254 is stored on a storage medium. From step 256, execution proceeds to step 208.

At step 208, a user interface receives a category selection from a user. In some embodiments, a plurality of event identifiers are displayed on the user interface and the user selects one of the event identifiers corresponding to the events recorded by the image-capture device. After an event identifier corresponding to a category of event types is received at step 208, at step 260 a determination is made as to whether high-resolution data is needed. If high-resolution data is determined to be needed, the data compressed to at least a second resolution level may be discarded or stored at a lower priority level to be discarded at a later time if additional storage space is needed. In this case, only the high-resolution data (i.e., uncompressed data or data stored at the first resolution level) is retained.

If at step 260 high-resolution data is not determined to be needed, execution proceeds to step 261, at which step the high-resolution data (i.e., uncompressed data or data stored at the first resolution level) may be discarded or stored at a lower priority level to be discarded at a later time if additional storage space is needed. In some embodiments, the data is compressed, for example, to a second and a third resolution level and one or both of the data so compressed may be stored responsive to a category selection.

Figure 3A:
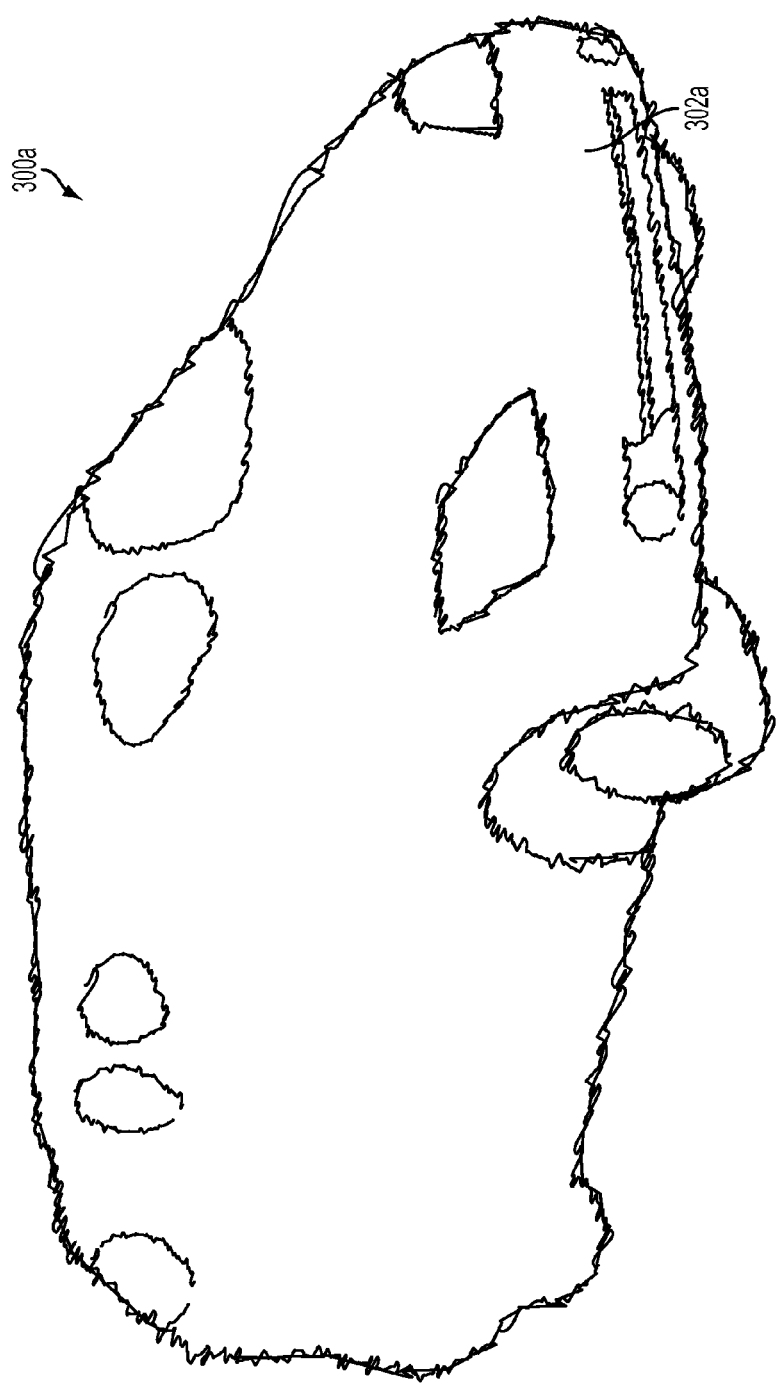
FIGS. 3A-3C are illustrative views of a vehicle at different resolution levels.
Figure 3B:
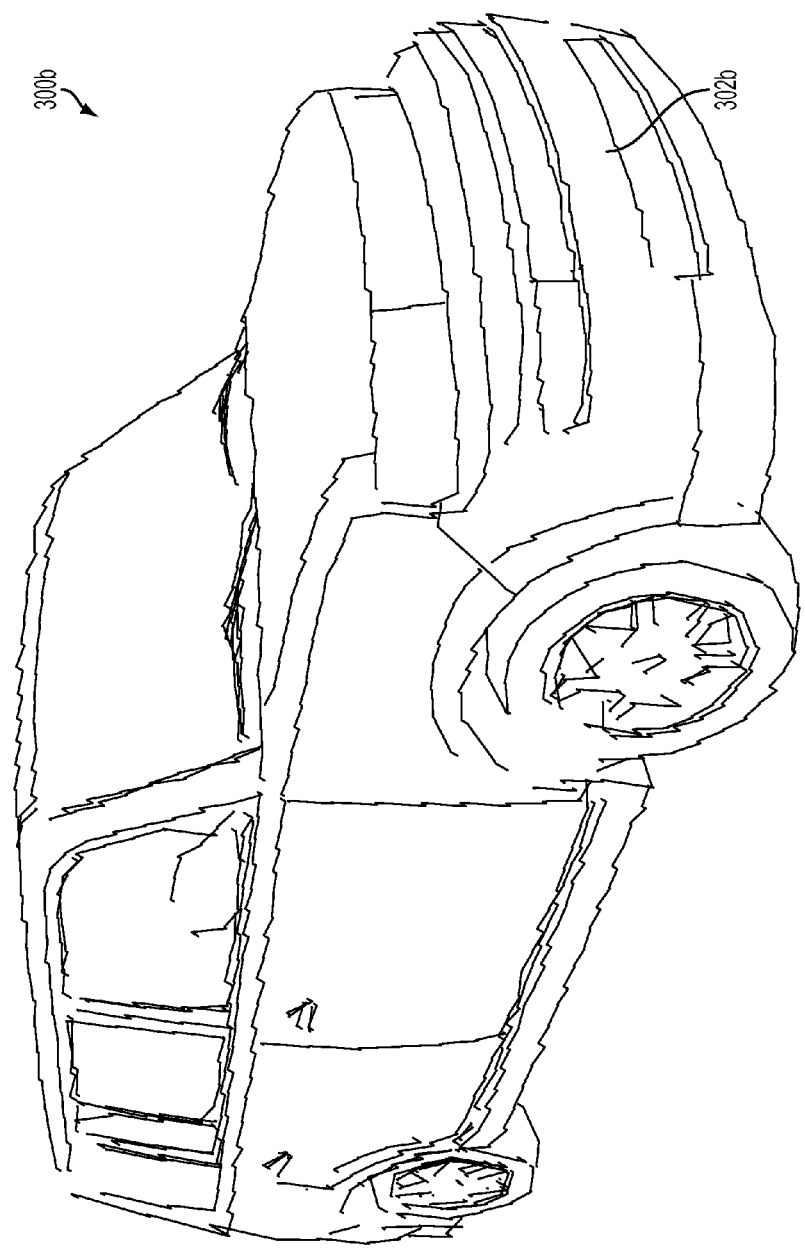
Figure 3C:
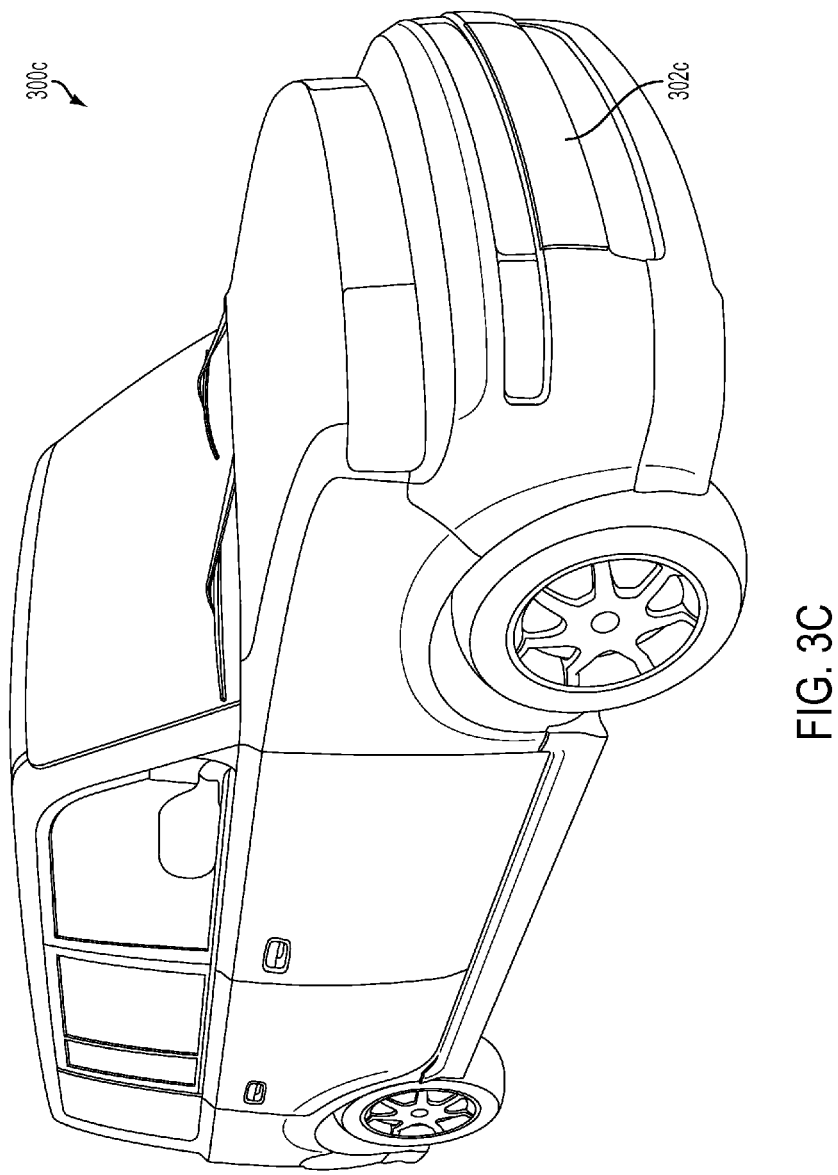

FIGS. 3A-3C are illustrative views of video-data images 300a-c compressed to different resolution levels. In the embodiment shown in FIG. 3A, the video-data image 300a is a vehicle 302a that has been compressed to a relatively low resolution level. In some embodiments, it may be desirable to compress data corresponding to an event of low importance, such as a routine traffic stop, to a low level of resolution. In the embodiment shown in FIG. 3B, the video-data image 300b is a vehicle 302b that has been compressed to a resolution level that is higher than the resolution level of FIG. 3A. In some embodiments, it may be desirable to compress data corresponding to an event of medium importance, such as a traffic stop in a school zone, to a medium level of resolution. In the embodiments shown in FIG. 3C, the video-data image 300c is a vehicle 302c that has been compressed very little or not at all. In some embodiments, it may be desirable to compress data corresponding to an event of high importance, such as a DWI traffic stop, to a high level of resolution. Those having skill in the art will appreciate that multiple images compressed, for example, to different resolution levels, can be shown on a single display in for example, separate panes.

Figure 4:
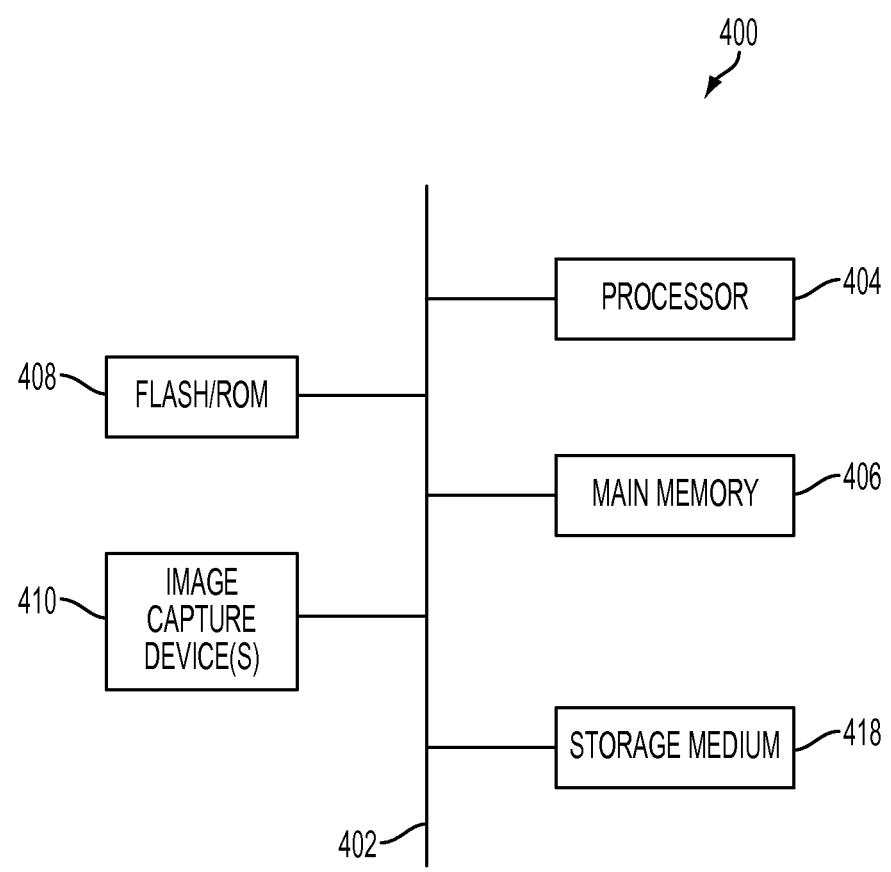
FIG. 4 is a diagram of a system for capturing and storing video data.

FIG. 4 illustrates a system 400 on which capturing and storing video data may be implemented. The system 400 includes a bus 402 for communicating information. The system 400 also includes a processor 404 coupled to the bus 402 and a main memory 406 such as, for example, a random access memory (RAM) or other dynamic storage device, coupled to the bus 402.

The system 400 also includes a flash or read only memory (ROM) 408 connected to the bus 402 for storing, for example, static information and instructions from the processor 402. The system 400 also includes at least one image-capture device 410. In a typical embodiment, the image-capture device 410 includes at least one digital video camera. In some embodiments, a plurality of digital video cameras are employed. When a plurality of digital video cameras are employed, raw video data captured by one digital video camera may in at least some cases be compressed to a different resolution level that raw video data captured by a second digital video camera. In a typical embodiment, various components of the system 400 are used to buffer raw video data of a recorded event and subsequently compress the video data at a first resolution level if the event is of a first category and compress the video data at a second resolution level if the event is of a second category.

Figure 5:
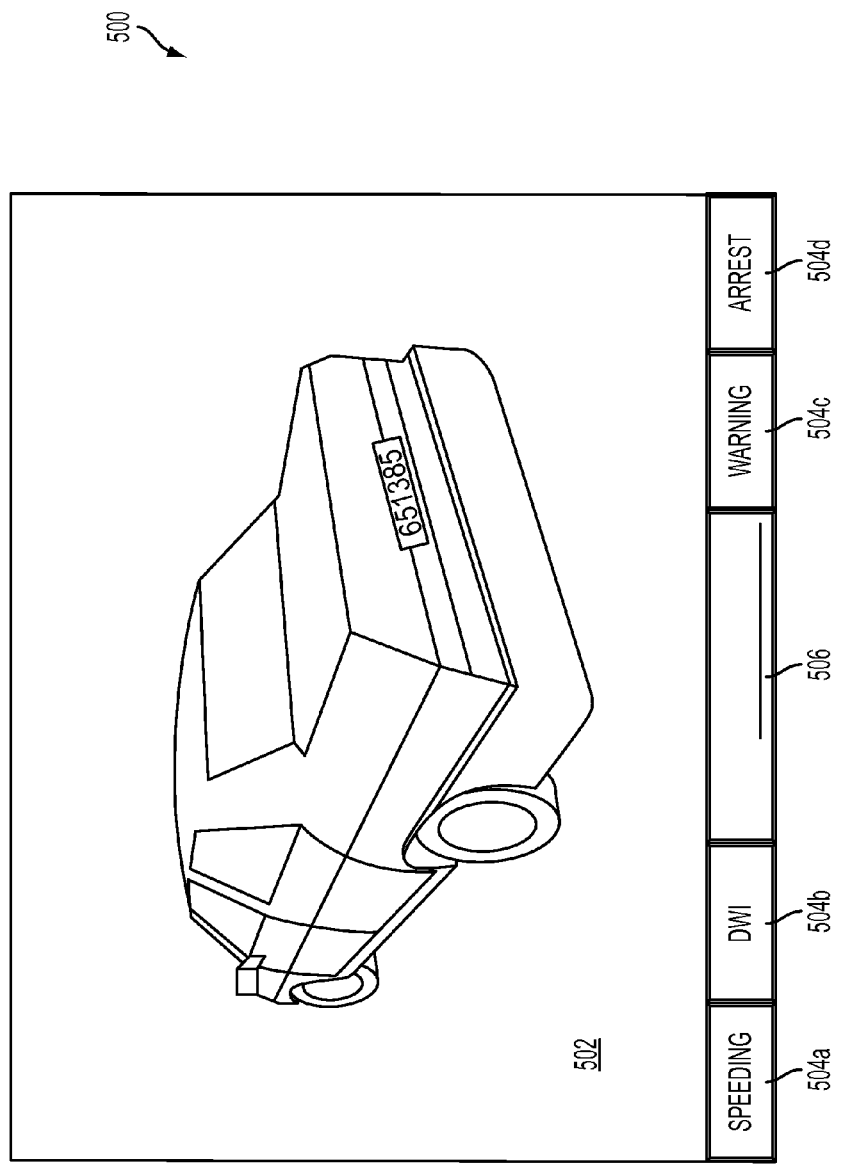
FIG. 5 is a diagram of a user interface.

FIG. 5 illustrates an embodiment of a user interface 500. In the embodiment shown, the user interface 500 includes a content window 502 having at least one an image of a vehicle displayed therein. For example, the content window 502 may display raw video data captured by the image-capture device of a vehicle in front of a patrol vehicle stopped by an officer during a traffic stop. The user interface 500 also includes a plurality of category buttons 504a-d and a user-input area 506. After the officer returns to the patrol vehicle, the officer can select one of the category buttons 504a-d corresponding to the type of stop. For example, the officer may select the category button 504a if the officer stopped the driver of the vehicle for speeding, the officer may select the category button 504b if the stop was a DWI stop, the officer may select the category button 504c if the officer only gave the driver a warning, or the officer may select the category button 504d if an arrest was made.

Oftentimes, when a driver is stopped for suspicion of driving while intoxicated, a sobriety test is administered and, if the driver is intoxicated, an arrest may be made. Captured video data of the sobriety test and subsequent arrest may be used at a later date as evidence during a trial. It would thus be important to save the captured video data at a higher resolution level than video that is not going to be relied on as evidence during trial. In some embodiments, the user-input area 506 may allow a user to create new categories or may allow a user to input information about the captured event. For example, when the officer returns to the patrol vehicle, the user interface 500 may display a series of questions for the officer to answer to determine the category and/or importance of the captured event. An initial question may ask whether an arrest was made or whether anyone was injured at a scene of an accident. Someone being arrested or being injured may indicate that the event was of high importance. Additional questions may be asked and additional answers elicited before a determination is made. Although the embodiment shown in FIG. 5 has four category buttons 504a-d shown across the bottom of the content window 502, more or fewer buttons may be included and/or the buttons may be located at different locations. In other embodiments, a list of event types may be used instead of or in addition to category buttons.

In some embodiments, different categories of events may be compressed to different resolution levels. The amount of compression may be predetermined by a user prior to the video-capturing device being deployed in a patrol vehicle. For example, a police chief or other supervisor may determine that certain events should be stored at a higher resolution level than other events. For example, if complaints of physical abuse have been reported against an officer, the supervisor may decide to record all arrests by that officer at a high level of resolution. The officer would not have the freedom of lowering the resolution level of the stored video for any particular category of captured video data. If the officer attempted to circumvent the resolution-determination process by entering incorrect category-identification information, the incorrect information would be evident because the category identifiers would not match the activities in the video and/or the police records of arrests made by the officer.

Those having skill in the art will appreciate that a plurality of video cameras may be used by a single vehicle and that different video cameras might have different pre-defined resolution levels. For example, a front-facing video camera might have a greater resolution level relative to a rear-facing video camera or a panoramic video camera might have a lesser resolution level relative to a main video camera. Moreover, compressed video data from different digital video cameras may be saved for different amounts of time in accordance with design criteria.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    compressing digital data to a second resolution level, the digital data comprising video images related to an event;
    storing the digital data at a plurality of resolution levels, the plurality of resolution levels comprising a first resolution level and the second resolution level;
    wherein the first resolution level is greater than the second resolution level;
    presenting to a user, on a user interface, a plurality of category selection options;
    receiving, from the user via the user interface, a category selection from the plurality of presented category selection options for the event, wherein the category selection is linked to a first pre-defined resolution level;
    allowing the user to change, via the user interface, the category selection prior to conclusion of the event such that the changed category selection is linked to a second pre-defined resolution level that is different from the first pre-defined resolution level;
    responsive to the changed category selection, determining whether the digital data stored at the first resolution level is needed;
    responsive to a determination that the digital data stored at the first resolution level is not needed, performing one of the following:
        discarding the digital data determined to not be needed; and
        flagging the digital data determined to not be needed to be discarded later.

2. The method of claim 1, wherein the first resolution level is compressed.

3. The method of claim 1, wherein the category selection is based on importance of the event depicted by the video images.

4. The method of claim 1, comprising, responsive to a determination that the digital data stored at the first resolution level is needed, performing one of the following:
    discarding the digital data stored at the second resolution level; and
    flagging the digital data stored at the second resolution level to be discarded later.

5. The method of claim 1, comprising:
    wherein the first resolution level is uncompressed; and
    responsive to a determination that the digital data stored at the first resolution level is needed:
        compressing the digital data stored at the first resolution level to a third resolution level that is greater than the second resolution level; and
        performing one of the following:
            discarding the digital data stored at the second resolution level; and
            flagging the digital data stored at the second resolution level to be discarded later.

6. The method of claim 1, wherein the category selection comprises selection of one of a resolution level, a video-quality setting, and a video data rate.

7. The method of claim 1, wherein:
    the plurality of resolution levels comprises a third resolution level; and
    responsive to the category selection, determining which of the digital data stored at the first resolution level, the digital data stored at the second resolution level, and the digital data stored at the third resolution level is to be retained.

8. A method comprising:
    storing digital data at a first resolution level, the digital data comprising video images related to an event;
    presenting to a user, on a user interface, a plurality of category selection options;
    receiving, from the user via the user interface, a category selection from the plurality of presented category selection options for the event, wherein the category selection is linked to a first pre-defined resolution level;
    allowing the user to change, via the user interface, the category selection prior to conclusion of the event such that the changed category selection is linked to a second pre-defined resolution level that is different from the first pre-defined resolution level;
    responsive to the changed category selection, determining whether greater compression of the digital data is needed;
    responsive to a determination that greater compression of the digital data is needed:
        compressing the digital data to at least a second resolution level;
    wherein the first resolution level is greater than the at least a second resolution level; and
        performing one of the following:
            discarding the digital data stored at the first resolution level; and
            flagging the digital data stored at the first resolution level to be discarded later.

9. The method of claim 8, wherein the first resolution level is compressed and the compressing of the digital data to the at least a second resolution level is performed by re-encoding the digital data stored at the first resolution level.

10. The method of claim 8, wherein the category selection is based on importance of the event depicted by the video images.

11. The method of claim 7, wherein the category selection comprises selection of one of a resolution level, a video-quality setting, and a video data rate.

12. The method of claim 8, wherein the first resolution level is uncompressed.

13. The method of claim 12, comprising:
    wherein the step of determining whether greater compression of the digital data is needed comprises determining the degree of compression needed;
    compressing the digital data to a third resolution level;
    wherein the at least a second resolution level comprises the third resolution level; and
    determining which of the digital data stored at the second resolution level and the digital data stored at the third resolution level is to be retained.

14. A computer-program product comprising a non-transitory computer-usable medium having computer-readable program code embodied therein, the computer-readable program code adapted to be executed to implement a method comprising:
    compressing digital data to at least a second resolution level, the digital data comprising video images related to an event;

storing the digital data at a plurality of resolution levels, the plurality of resolution levels comprising a first resolution level and the second resolution level;
  wherein the first resolution level is greater than the second resolution level;
  presenting to a user, on a user interface, a plurality of category selection options;
  receiving, from the user via the user interface, a category selection from the plurality of presented category selection options for the event, wherein the category selection is linked to a first pre-defined resolution level;
  allowing the user to change, via the user interface, the category selection prior to conclusion of the event such that the changed category selection is linked to a second pre-defined resolution level that is different from the first pre-defined resolution level;
  responsive to the changed category selection, determining whether the digital data stored at the first resolution level is needed;
  responsive to a determination that the digital data stored at the first resolution level is not needed, performing one of the following:
    discarding the digital data determined to not be needed; and
    flagging the digital data determined to not be needed to be discarded later.

15. The computer-program product of claim 14, wherein the first resolution level is compressed.

16. The computer-program product of claim 14, wherein the category selection is based on importance of the event depicted by the video images.

17. The computer-program product of claim 14, the method comprising, responsive to a determination that the digital data at the first resolution level is needed, performing one of the following:
  discarding the digital data stored at the second resolution level; and
  flagging the digital data stored at the second resolution level to be discarded later.

18. The computer-program product of claim 14, the method comprising:
  wherein the first resolution level is uncompressed; and
  responsive to a determination that the digital data stored at the first resolution level is needed:
    compressing the digital data stored at the first resolution level to a third resolution level that is greater than the second resolution level and less than the first resolution level; and
    performing one of the following:
      discarding the digital data stored at the second resolution level; and
      flagging the digital data stored at the second resolution level to be discarded later.

19. The computer-program product of claim 14, wherein the category selection comprises selection of one of a resolution level, a video-quality setting, and a video data rate.

20. The computer-program product of claim 14, wherein:
  the plurality of resolution levels comprises a third resolution level; and
  responsive to the received category selection, determining which of the digital data stored at the first resolution level, the digital data stored at the second resolution level, and the digital data stored at the third resolution level is to be retained.

21. A computer-program product comprising a non-transitory computer-usable medium having computer-readable program code embodied therein, the computer-readable program code adapted to be executed to implement a method comprising:
  storing digital data at a first resolution level, the digital data comprising video images related to an event;
  presenting to a user, on a user interface, a plurality of category selection options;
  receiving, from the user via the user interface, a category selection from the plurality of presented category selection options for the event, wherein the category selection is linked to a first pre-defined resolution level;
  allowing the user to change, via the user interface, the category selection prior to conclusion of the event such that the changed category selection is linked to a second pre-defined resolution level that is different from the first pre-defined resolution level;
  responsive to the changed category selection, determining whether greater compression of the digital data is needed;
  responsive to a determination that greater compression of the digital data is needed:
    compressing the digital data to at least a second resolution level;
    wherein the first resolution level is greater than the at least a second resolution level; and
    performing one of the following:
      discarding the digital data stored at the first resolution level; and
      flagging the digital data stored at the first resolution level to be discarded later.

22. The computer-program product of claim 21, wherein the first resolution level is compressed and the compressing of the digital data to the at least a second resolution level is performed by re-encoding the digital data stored at the first resolution level.

23. The computer-program product of claim 21, wherein the category selection is based on importance of the event depicted by the video images.

24. The computer-program product of claim 21, wherein the category selection comprises selection of one of a resolution level, a video-quality setting, and a video data rate.

25. The computer-program product of claim 21, wherein the first resolution level is uncompressed.

26. The computer-program product of claim 21, comprising:
  wherein the step of determining whether greater compression of the digital data is needed comprises determining the degree of compression needed;
  compressing the digital data to a third resolution level;
  wherein the at least a second resolution level comprises the third resolution level; and
  determining which of the digital data stored at the second resolution level and the digital data stored at the third resolution level is to be retained.

* * * * *

UNITED STATES PATENT AND TRADEMARK OFFICE
CERTIFICATE OF CORRECTION

| | | |
|---|---|---|
| PATENT NO. | : 8,982,944 B2 | Page 1 of 1 |
| APPLICATION NO. | : 12/694931 | |
| DATED | : March 17, 2015 | |
| INVENTOR(S) | : Robert V. Vanman et al. | |

It is certified that error appears in the above-identified patent and that said Letters Patent is hereby corrected as shown below:

<u>In the Specification</u>      <u>Application File</u>

Column 1, Line 42     Replace "data stored at least the first" with
-- data stored at at least the first --

Column 1, Line 44     Replace "stored at least the first resolution level" with
-- stored at at least the first resolution level --

Column 2, Line 1     Replace "data stored at least the first" with
-- data stored at at least the first --

Column 2, Line 3     Replace "stored at least the first resolution level" with
-- stored at at least the first resolution level --

Signed and Sealed this
Twenty-first Day of July, 2015

Michelle K. Lee
*Director of the United States Patent and Trademark Office*